Aug. 19, 1958    C. E. RICKARD ET AL    2,848,135
COUPLING NOSE FITTING
Filed July 3, 1957
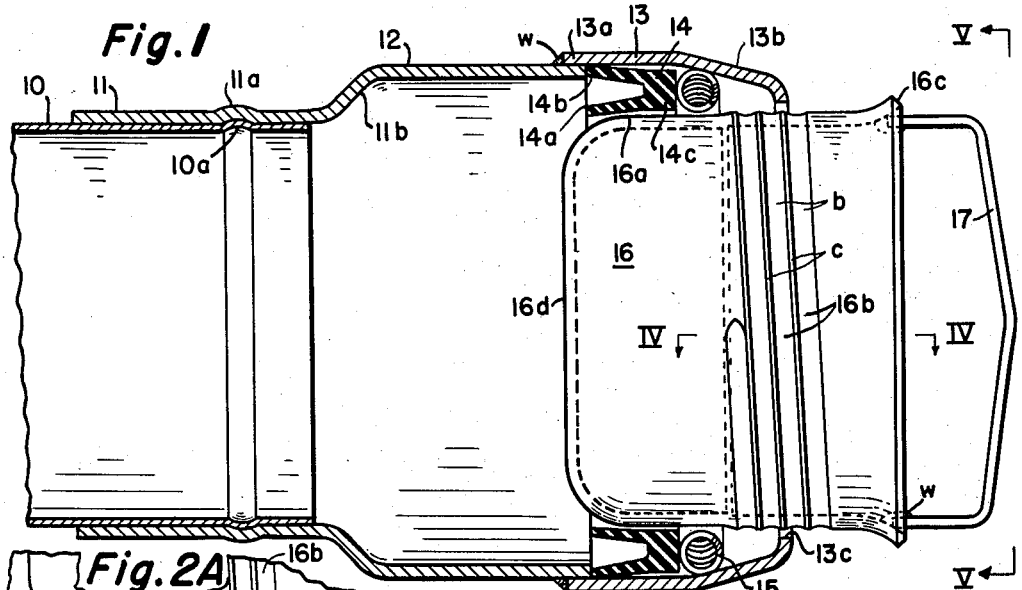
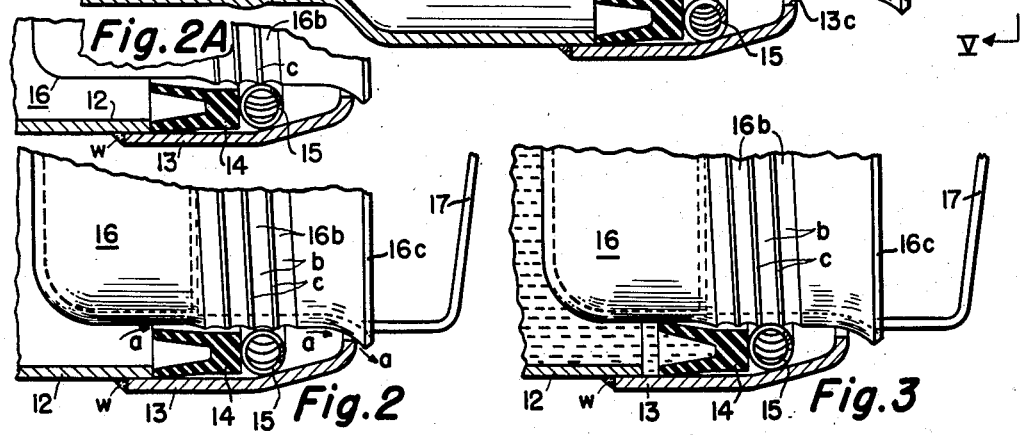
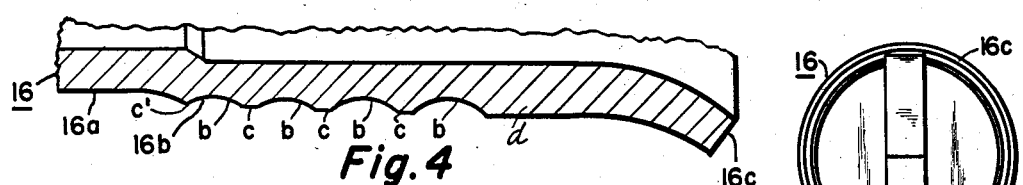
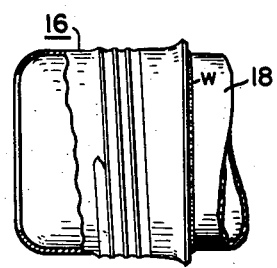
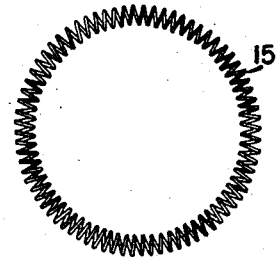
INVENTORS
Clyde E. Rickard
Gustav A. Hempel
BY
THEIR ATTORNEYS

United States Patent Office 2,848,135
Patented Aug. 19, 1958

2,848,135

COUPLING NOSE FITTING

Clyde E. Rickard and Gustav A. Hempel, Pittsburgh, Pa., assignors to McDowell Manufacturing Company, Pittsburgh, Pa., a corporation of Pennsylvania Continuation of application Serial No. 377,887, September 1, 1953. This application July 3, 1957, Serial No. 669,899

5 Claims. (Cl. 220—46)

This invention relates to a coupling nose fitting to be used with a quick-release coupling construction which employs a housing having an operatively positioned grip coil and particularly, to a fitting that, when inserted in position within a housing carrying operatively co-operating grip coil and gasket elements and after a preliminary liquid pressure application has been made, will provide a highly positive mechanical interlock with the grip coil against an axial or longitudinal withdrawal of the fitting, even when the liquid pressure is relieved and until the fitting is, in effect, turned out of the housing.

In the original Beyer quick-release type of coupling, the grip coil or annulus was so positioned and had a diameter such that the coil in its initial operating position had an engaging relationship, not only with the operating surface of the cone-shaped throat of the coupling housing body, but also with the cylindrical end portion or nose of a pipe member to be held therewithin. This construction provided what may be termed a somewhat minimized mechanical holding action upon the pipe member when no fluid pressure was being applied. When fluid pressure was applied, the gripping action of the coil (as effected by the co-operating action of an annular fluid-sensitive gasket) increased proportionally with the fluid pressure as it was increased. The resiliency of the grip coil, however, would cause it to release its intensified gripping action after fluid pressure had been relieved. In this type of coupling, the pipe end or nose portion could not be inserted without turning the nose portion relative to the coupling housing to accomplish a tilting action upon the convolutions of the grip coil while exerting an axial pushing-in force. To remove the pipe portion, it was turned while an axial pulling-out force was applied.

As this quick-release coupling art has developed and particularly, in the mobile irrigation field where it has great usefulness, it was found to be advantageous to provide a construction wherein the pipe member or nose portion could be inserted and withdrawn by a simple, axial or longitudinal push-in and pull-out movement with respect to the housing. In this construction, the inner gripping portion of the coil was provided with a diameter that was slightly greater than the outer diameter of the end portion or nose portion, in other words, with a slight clearance with respect thereto. This eliminated the mechanical holding action of the coil when fluid pressure was relieved. However, with such an arrangement, it was found necessary to provide the end portion or nose portion with an inwardly-offset safety groove to limit the tendency of the pipe member to move axially out of the coupling housing upon applications of fluid pressure and before the grip coil had an opportunity to become fully effective. We found, however, that such a safety groove was only effective when care was taken to avoid a sudden heavy application of liquid pressure and particularly, when the nose part was carried by a pipe member constituting an axially-aligned intermediate member of a series of connected pipe members or was, to some extent, held in position by some external means. That is, external holding and frictional-positioning factors have an influence in providing a sufficient initial resistance to endwise movement to give the grip coil an opportunity to assume a gripping position. However, the danger of shooting the nose portion out of the coupling housing is present when it constitutes a dead end of a pipe line, a corner connection, etc.

Thus, it has come to our attention that there is a need for a further type of quick-release pressure-grip coupling construction whose nose portion can be easily and quickly assembled within a coupling housing by pushing it axially or longitudinally therein, but which when in an assembled relationship will be positively held in position against an outward axial or longitudinal separation before and while liquid pressure is applied, will be "set" by an initial liquid pressure application, and after being set will highly positively be held in a fixed position against both inward and outward, or a combination of inward and outward, axial or longitudinal movements. This need centers around applications, such as for a pipe dead end or connector or in military and other fields, where positive and foolproof assurance against shooting out of the nose portion is required when liquid pressure is applied and where relative movement of the nose portion must be prevented after an initial application of liquid pressure.

In the above second-mentioned old construction, relative movement on each application of liquid pressure is more or less inherent and there is also a tendency towards relative movement on line surges, etc. Even in the original Beyer construction, there is a tendency toward some relative movement, particularly under sudden, extremely high liquid pressure applications (before the translation of liquid pressure to holding force has become fully effective).

In view of the above considerations, it has been an object of our invention to provide a practical construction for meeting the problem herein involved;

Another object has been to devise a new and improved nose fitting which may be effectively utilized with a quick-release type of coupling to provide an easy and simple assembling operation and, after assembly and having been set by an initial application of fluid pressure and its release, will maintain a fool-proof, mechanical holding action under all operating conditions and in absence of a deliberately effected disassembling operation.

A further object has been to provide a nose fitting part that may be utilized with a coupling housing body having co-operating grip coil and annular gasket elements to provide a member-holding action that is at least proportionately high as liquid pressure being applied, and such that the nose part will be positively retained in position within the housing, regardless of whether liquid pressure is being applied, maintained, varied or removed, is positive or negative or entirely lacking;

These and many other objects of our invention will appear to those skilled in the art in view of the claims and the detailed description.

In the drawings:

Figure 1 is a side sectional view in elevation through a coupling assembly employing a nose fitting or part of our invention; in this figure, the nose part is in a partially inserted position with respect to a housing body of the assembly;

Figure 2 is a vertical side fragment on the scale of the construction of Figure 1, showing the nose part or fitting of our invention fully pushed within the coupling housing and ready for an application of liquid pressure thereto;

Figure 2A is a fragmental view somewhat similar to Figure 2 to illustrate the position of Figure 2, but taken through a different longitudinal section of the construction;

Figure 3 is a vertical side fragment on the scale of Figure 1, showing a relationship of parts of the construction after liquid pressure has been initially applied;

Figure 4 is an enlarged side sectional fragment along the nose part;

Figure 5 is an end view in elevation taken along the line IV—IV of Figure 1 and on a reduced scale;

Figure 6 is a vertical side view in elevation and partial section on the scale of Figure 5 showing a modified construction of the nose part of our invention and illustrates its adaptability, as will be hereinafter more particularly explained; and Figure 7 is an end view in elevation on the scale of Figure 5 showing the construction of a grip annulus or coil employed in the coupling arrangement of Figure 1.

In attempting to arrive at a solution to the problem above outlined, we discovered a number of requirements in combination which appeared at first to be insurmountable. One requirement was that the member-holding action or force of the coupling should, as a minimum, be at least equal to any liquid pressure force that may be positively applied to the coupling. Another requirement was that the member-holding action should be sufficient to withstand momentary negative force (as in the form of line surges) once a positive force has been applied.

Another requirement was that after the coupling was in a set position, a positive member-holding action should be mechanically retained at all times during the utilization of the coupling, but in such a manner, that it could be relatively easily and quickly released when the nose part is to be removed. A further requirement was that the nose part should be capable of being moved to an assembled position by a simple axial pushing-in movement. A still further requirement was that the nose part should be held within the coupling housing against relative axial, outward movement in a fool-proof manner.

We determined that the construction should be such as to permit the grip coil to be advanced forwardly along the converging throat of a coupling housing body by co-operating action with an annular fluid sensitive gasket, but further, should be such that the advanced positioning of the grip coil or annulus would be substantially retained after liquid pressure had been released, and until a quick mechanical release of such action could be effected when manually applied in a designated fool-proof manner. Further, we determined that the mechanical gripping action, as thus accomplished, should not prevent a further advance of the grip coil into an even greater holding relationship when a later-applied liquid pressure of higher extent is utilized in the pipe line. The problem was further complicated by reason of the need for providing an easy and simple axial or longitudinal insertion of the nose part within the coupling body without twisting or other types of more or less involved movements.

We finally conceived the idea of utilizing a spiral or thread-like sector on a nose part 16 (which, of course, includes an end portion of a pipe member or a reinforcing element secured thereon) which would co-operate with and grip-engage the grip coil or element after its insertion in the coupling housing and would receive a "set" upon an initial application of liquid pressure. It was determined that an easy push-in axial insertion of the nose part could be accomplished without detrimentally affecting the meeting of the other requirements by providing the nose part with an outer peripheral operating surface of a lesser diameter than the inner peripheral diameter of the grip coil or annulus, when the coil is in a fully operative and initial position (unflexed) within and on the cone-shaped operating surface of a throat of the coupling housing and in an operative relationship with respect to the annular gasket. The utilization of a spiral sector area having a spiral crest portion of a greater diameter than the outer peripheral operating surface and a spiral root or groove portion of a diameter substantially corresponding to that of such operating surface and both the portions, of the same relatively wide taper (for example, of a pitch of about 4 threads per inch), was found to be the basic or most important feature.

As shown in Figure 4 of the drawings, the crown or crest portion of spiral sector area 16b starts with a substantially angular face c' and thereafter, has a face c of substantially flat or planar section. Since the diameter of root portion b is shown as constant along its extent and the diameter of the crown or crest portion c is shown as increasing at the rate of about 2° longitudinally along the outer surface of 16b, each successive turn of the root or groove portion b increases in width towards the outer end of the nose part 16. It will be also noted that the root portion b is of curved section.

By way of example, the diameter of an entry end sector area 16a (which is substantially uniform along its length) may be about 4.250 inches, the diameter of c' may be about 4.285 inches, and the diameter of an outer end sector area d may be about 4.341 inches. As shown, the diameter of the root b may be a few thousandths of an inch greater than the diameter of the sector 16a, but will, generally speaking, be about the same as that of 16a. Also the inner diameter of the convolutions of grip coil 15 in its initial position of Figure 1 will normally be only sufficient to clear the crest portion c' or about the same as the outer diameter of the crest portion c', so that the coil will frictionally engage portion c with slightly increasing force as the nose part 16 is moved inwardly from the position of Figure 1 to the position of Figures 2 and 2A. It will also be noted that the nose part 16 defines a clearance spacing between its sector area 16a and the grip coil 15 and between the root portion b and the grip coil before an initial application of liquid pressure is made, compare Figures 1 and 2 with Figure 3.

The nose part 16 can (as shown in Figures 1 and 2) be freely advanced or pushed within a coupling body until cooperating stop abutment means (rim edges 13c and 16c) are in engagement. This relationship (shown in Figure 2) is retained until (as shown in Figure 3) liquid pressure is applied. Thence, after an initial, slight axial movement of a maximum of about one-eighth of an inch (compare Figures 2 and 3), a fluid-pressure-advanced grip-positioning of the coil 15 is retained after each subsequent application and release of fluid pressure and until the nose part 16 is turned counter to such threads (counterclockwise of the assembly shown in Figure 3) and with respect to the housing body thereof.

Although the nose part 16 can be inserted by a simple axial-inward movement, it cannot be withdrawn by a similar axial-outward movement, even before liquid pressure has been applied. During the inward-axial movement, portions of the crest c of the spiral area will slide under the grip coil 15, since the latter may adjust itself inwardly towards the diverging end of its cone-shaped operating surface, but if an attempt is made to reverse the axial movement, the frictional engagement of coil-engaging portions of the crest tends to cause the coil to move towards the converging end of its cone-shaped operating surface and insure a locking or holding action.

A relatively high "set" holding or gripping position of the coil is attained when liquid pressure is applied to the coupling and it is only released by an initial out-turning movement manually applied to the nose part. After the initial release of such a set, the outward turning movement is effected by a substantaially uniform force throughout the extent of engagement of the grip coil with the spiral sector; no positive outward pull is necessary.

Essentially, in carrying out our invention, we provide a cylindrical nose part 16 for a quick-release coupling housing construction which part has a smooth surface cylindrical sector area 16a at its entry end portion to co-operate with the gasket sealing element 14 of the coupling, and provide a fully sealed-off relationship when liquid pressure is applied. The cylindrical sector area 16a is followed by an intermediate spiral sector area 16b of the previously described construction which is to be positioned in an operative relationship with respect to a grip coil 15 of the coupling construction and in an opposed operating-space-defining relationship with an outwardly-converging cone-shaped throat 13b of the coupling housing body.

The nose part, indicated generally as 16, is shown provided with a stop projection (see the radially-outwardly projecting rim edge or flange 16c) that is adapted to engage the outer end of the coupling body (see the inturned or radially-inwardly projecting rim edge or flange portion 13c). Thus, as indicated in Figures 1 and 2, the proper operative positioning of the nose part 16 is assured by inserting the nose part within the coupling body substantially until its stop or limit flange 16c engages the stop or limit flange 13c of the latter. At this time, the nose part 16 cannot be removed from the housing body without turning it. It will be noted that the coil 15, being an annulus, has no taper and thus, that a portion of its length lies upon or crosses the crest portion of the spiral sector and is in frictional engagement therewith. As a result, an attempt to axially withdraw the nose part (without a turning movement) will only cause the grip coil 15 to increase its frictional engagement between the throat 13b and to expand it into the root portion of the spiral sector 16b of the nose part.

As indicated in Figure 3, the nose part 16 is, in effect, set in its positive-mechanically-held position by the first or initial application of liquid pressure to the assembly. As indicated, this is accomplished by a liquid pressure actuation of the gasket 14 to advance the grip coil 15 along the converging cone-shaped operating surface 13b and causes the grip element 15 to latch within the root portion of the spiral sector 16b.

Contrary to what may be expected, the grip coil 15 retains its advanced gripping position upon a given application of liquid pressure and does not return (as in the old type of quick release coupling) to its initial or releasing position after liquid pressure has been relieved. In other words, the locking sector area 16b of the nose part acts as a positive locking device once the coupling has been set, as above outlined, to prevent any relative axial movement between the nose part and the coupling housing. In spite of this fact, a subsequent re-application of liquid pressure, of even a higher value than initially applied, will still be translated into a member-holding action that is proportional to the pressure force. Although relative movement is inhibited, the additional pressure force tends to squeeze the grip coil 15 with a greater frictional force between the opposed operating surfaces which it engages. Thus after an initial setting, the mechanical holding force maintained by the nose part 16 is of a relatively high value, such that slippage between the nose and coupling body parts is prevented at all times until a specifically applied type of releasing action is employed.

We have found that the crossing-over of the grip coil as to a spiral crest portion c of the sector area 16b provides a latching or locking point which further insures the maintenance of the liquid pressure obtained setting. On the other hand, when the nose part 16 is turned outwardly counter to the spiral of its sector area 16b, the crossing-over portion of the grip annulus 15 serves to cause a release of the grip coil from its highly positive setting and thereafter, the nose part can be easily turned outwardly and withdrawn. In other words, the outward turning movement imparted to the nose part 16 with respect to the housing body produces a counterforce which moves the grip coil backwardly along its throat 13b and out of effective engagement within the root or valley portion b of the intermediate or spiral sector area 16b.

By the time the coil 15 reaches the end of the spiral sector area, it has then attained its initial non-engaging relationship with respect to the outer diameter of the entry portion 16a of the nose part, so that the nose part can then be pulled directly (axially) outwardly to withdraw the cylindrical portion 16a and complete the separation of the parts. We have illustrated this final releasing position as thus accomplished in Figure 1 which position, as previously pointed out, is the initial position of the grip coil 15 before its interlocking action has been effected.

In the drawings, 10 is a cylindrical end portion of a pipe line member to which a housing body is secured by annular tongue and groove portions 10a and 11a of telescopically interfitting sleeve-like portions 10 and 11. The portion 11 of the coupling housing body has an outwardly-enlarging shoulder 11b connected to a cylindrical portion 12 of greater diameter. A coupling throat part 13 is, as shown particularly in Figure 1, secured as by weld metal w to the portion 12 to project forwardly thereof. The throat 13, as shown, has a cylindrical operating surface portion 13a which operatively carries a liquid-pressure-sensitive annular gasket 14 and also has a forwardly-inwardly-converging cone-shaped operating surface portion 13b which operatively receives the grip coil 15. The grip coil 15 is particularly illustrated in Figure 7 as having a series of spaced-apart spiral convolutions. The throat portion 13b terminates in a radially-inwardly-projecting stop rim flange 13c whose utilization has been previously explained.

It will be noted that the gasket 14 has a radial inner side leg portion 14a to co-operate with the cylindrical portion 16a of the nose part 16 and has an outer side leg portion 14b co-operate with the cylindrical portion 13a of the throat. The leg portions 14a and 14b with a pressure heel portion 14c define a somewhat V-shaped inner chamber that is open to fluid flow into the coupling assembly. The pressure heel portion 14c holds the grip coil or annulus 15 in an initial operating position on the cone-shaped portion 13b, so that the coil may be advanced as shown in Figure 3 to a gripping setting therealong.

As shown in Figure 2, the outer diameter of the cylindrical portion 16a may be slightly less than the inner diameter of the leg portion 14a of the gasket to permit air venting as the liquid pressure is being applied. In this connection, see arrows a of Figure 2. This, of course, facilitates filling the pipe line with liquid and the subsequent utilization of such liquid, as for example, to actuate irrigating spray heads.

As shown particularly in Figures 1 and 2, the nose part 16 may have a backwardly or outwardly projecting handle 17 secured as by weld metal w within its rim flange 16c. The handle 17 is particularly useful when the nose part has a closed inner end wall 16d and is thus employed as a dead end for a pipe line layout. However, as illustrated in Figure 6, the handle 17 may be removed and a connecting tubular sector 18 may be welded in substantially the same position within and about the stop flange 16c. In this connection, the sector 18 may be threaded to provide a sprinkler adapter or may be closed off and provided with an automatic relief valve, may constitute one end of an end T, a line T, a reducing end T, an end of a pipe connection, or other fitting parts as desired.

It is interesting to note that once the nose part of our construction has been set by liquid pressure, it cannot be turned during a positive application of liquid or of fluid pressure after the gasket side leg 14a is in sealing engagement with the cylindrical portion 16a and can only be removed after the relief of fluid pressure and by counterturning it and its spiral area 16b. In this connection, however, no outward pulling force has been found necessary. A counterturning of the nose part 16 with respect to the coupling housing will release the grip coil 15 so that it returns (by reason of its flexibility) to the initial position of Figure 2.

Wallace Patent No. 2,709,092 shows that a radially-inwardly depressed annular safety groove portion may be successfully used with an annular or cylindrical operating surface of a nose or male part of a coupling, where an annular flexible grip annulus is employed in a radial spacing between the nose part and a cone-shaped housing throat part. The present invention deals with a discovery that a nose or male part could be provided with an annular screw or thread wall therealong which could be utilized in a practical manner with a cooperating, convoluted, flexible grip annulus. The purpose has been to provide a coupling which will make possible an easy push-in assembly of its parts, but which, under no conditions, can be directly-longitudinally or axially pulled-out or shot-out under a sudden fluid pressure application, but which must be released or moved-out by turning it out.

Although threads, in a sense, may suggest a turning action, they inherently involve a turning-in and a turning-out movement. We discovered that threads can be successfully utilized with a flexible grip annulus to accomplish a new type of action in a heavy duty coupling by employing a specially-threaded wall. The problem was complicated by the fact that grip annulus having normally spaced-apart convolutions has heretofore only been employed to effectively hold members in a coupled or assembled relationship, where the annulus operates along its inner and outer peripheries between two opposed surfaces, in the sense of cone-shaped or cylindrical surfaces, or smooth surfaces of uniform diameter thereabout (as to the operating plane of the grip annulus which is substantially normal to the longitudinal or axial plane of the coupling).

We discovered that damage to the threads could be eliminated, such as cross-cutting, deforming or tearing, that the desired type of assembly and disassembly could be effected, and that not only could a fully positive safety-hold action be effected, but one that would be of a fluid-pressure-sensitive holding type (where a gasket is used in combination with the grip annulus).

An important feature is the discovery that a positive holding action could be made effective, contrary to the heretofore held theory that it was necessary or essential to provide the grip annulus with what amounts to a continuous smooth inner and outer annular or line contact with both of the opposed operating surfaces during the gripping operation.

As will be appreciated from a study of Figures 1, 2 and 2A of the drawings, it is not possible to provide a spiral threading or screw wall, such as 16b, with which the grip coil or annulus 15 will make a continuous or uniform-line or annular contact. The reason is that the grip annulus 15 must, at some place, cross on crest portion c from one root portion b into another adjacent root portion b, if, as contemplated, the grip annulus is to operate with its inner periphery or annular plane in a position substantially normal or a right angle to the longitudinal axis of the coupling or of the nose 16.

We discovered that the crest c (along the annular screw wall 16b) should, as shown in Figure 4, have a substantially planar or flat section, rather than, as customary, a sharp edge. In accordance with the principles of our invention, a greater portion of the axial length of the inner periphery of the grip annulus 15 will rest within the root portion b and a minor portion of the inner periphery will, in effect, cross-over or frictionally engage on the crest portion c (between adjacent roots b). It is indeed surprising that the nose can be pushed into its assembled relationship, in spite of the frictional engagement of the annulus 15 with the crest portion at all times, when this same engagement insures that the nose will not, under any conditions, be shot-out of the housing body.

To summarize briefly, we have discovered that it is possible to, in effect, employ a grip coil 15 with an inner diameter or periphery which normally has a radially-spaced relationship with respect to the nose or male part to be gripped, and whose convolutions do not make a fully uniform or equal radius of engagement (where a portion of the inner periphery has a cross-over relationship with respect to a crest or high point of the nose gripping surface). We have further discovered and have made it possible to positively, without any danger of shoot-out, hold a nose or male part in position against a manual withdrawal effort or an application of fluid pressure, while still providing a fluid-sensitive member-holding action as effected by a gasket and also providing the above-discussed novel type of assembling and disassembling operation.

What we claim is:

1. In a fully push-in assembled and a screw-out released and disassembled coupling that positively holds its parts in an assembled position when one part is inserted within the other, wherein one of the parts is a housing body provided with a forwardly-converging internal operating surface defining an open-end throat portion, wherein the other part is a tubular nose for insertion within the housing body, wherein a flexible grip annulus has integral and normally spaced-apart convolutions defining substantially continuous inner and outer contact peripheries therealong and is carried by the housing body for operative movement on the throat portion to hold the nose in position within the housing body, and wherein the annular axis of the grip annulus is adapted to lie on a plane normal to the longitudinal axis of the nose when the coupling parts are being held in an assembled position with respect to each other; a rounded front end annular wall on the nose for pushing it within the housing body, an annular spiral screw wall on the nose behind said front end wall to cooperate with and provide an operating surface for the inner contact periphery of the grip annulus, said screw wall having spiral crest and root portions therealong, said front end wall and the root portions of said screw wall having a radially-spaced relation with the inner contact periphery of the grip annulus when the nose is being inserted within the housing body, the crest portion of said screw wall having frictional engagement with a minor portion of the inner contact periphery of the grip annulus when the nose is being inserted within the housing body, a major portion of the annular length of the inner contact periphery of the grip annulus lying within the root portion and the minor portion of the annular length continuing to frictionally engage the crest portion when an axial withdrawal effort is being applied to the nose, said crest portion being of substantially flat cross-section, and said root portion having a cross-sectional curvature along its length substantially corresponding to the cross-sectional curvature of the grip annulus to positively hold said major portion of the annular length of the grip annulus in position within said root portion and while said crest portion is in frictional engagement with said minor portion of the annular length.

2. A coupling as defined in claim 1 wherein, said front end wall has an end closure wall to provide a dead-end construction, the nose has a back end annular wall beyond said screw wall, and a U-shaped handle is secured at its ends to and projects backwardly from said back end wall to facilitate inserting the nose into and screwing it out of the housing body.

3. A coupling as defined in claim 1 wherein, said root portion has a substantially uniform outer diameter along its spiral extent, and said crest portion has a slightly outer increased diameter from said front end wall backwardly along said screw wall.

4. A coupling as defined in claim 1 wherein, a fluid-sensitive annular gasket is operatively carried within the housing body in operative association with the grip annulus to advance the grip annulus forwardly along the throat portion in a plane that is substantially normal to the longitudinal axis of the coupling, and the grip annulus is advanced by the gasket along the forwardly-converging internal operating surface of the throat portion and into a substantially continuous gripping engagement for the extent of its outer periphery with the operating surface of the throat portion and a substantially continuous gripping engagement for the extent of its inner periphery with said root and crest portions of the screw wall upon a positive application of fluid pressure to the coupling.

5. A cup-shaped tubular nose fitting for insertion within a coupling housing body and for operatively receiving a grip annulus thereabout within the housing body, said nose fitting having a smooth cylindrical forward wall rounded into a front end closure wall, said nose fitting having a smooth cylindrical backward wall terminating in a radially-outwardly flared flange to cooperate with the housing body and limit maximum insertion of said nose fitting therein, said backward wall having a greater outer diameter than said forward wall, said flange having an open back end portion, a spirally-threaded intermediate wall connected between said forward and backward walls and having root and crest portions therealong defining about four threads per inch, said crest portion being substantially planar in cross-section along the major portion of its length and across which the grip annulus is to extend, said crest portion being of greater outer diameter than said forward wall and of substantially the same diameter as said backward wall, said root portion having a curved cross-section of a substantially uniform diameter that substantially corresponds to the outer diameter of said forward wall and that corresponds substantially to the cross-sectional curvature of the grip annulus to receive a major portion of its length therein, and a U-shaped handle positioned within said open back end portion and secured thereto to project backwardly therefrom for inserting and withdrawing said nose fitting with respect to the housing body.

References Cited in the file of this patent

UNITED STATES PATENTS

| | | |
|---|---|---|
| 953,844 | Kimball | Apr. 5, 1910 |
| 1,602,792 | Baechle | Oct. 12, 1926 |
| 2,000,947 | Hauser | May 14, 1935 |
| 2,191,015 | Hoffman | Feb. 20, 1940 |
| 2,463,981 | Lee | Mar. 8, 1949 |
| 2,709,092 | Wallace | May 24, 1955 |